(12) United States Patent
Mayle

(10) Patent No.: US 10,943,065 B2
(45) Date of Patent: Mar. 9, 2021

(54) SYSTEMS AND METHODS FOR RENDERING DATA BASED ON FIXED-LENGTH TEMPLATING

(71) Applicant: Facebook, Inc., Menlo Park, CA (US)

(72) Inventor: Douglas Michael Mayle, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 195 days.

(21) Appl. No.: 15/657,062

(22) Filed: Jul. 21, 2017

(65) Prior Publication Data

US 2019/0026262 A1  Jan. 24, 2019

(51) Int. Cl.
*G06F 40/186* (2020.01)
*G06F 16/958* (2019.01)
*G06F 40/14* (2020.01)

(52) U.S. Cl.
CPC .......... *G06F 40/186* (2020.01); *G06F 16/972* (2019.01); *G06F 40/14* (2020.01)

(58) Field of Classification Search
CPC .................................................. G06F 11/1438
See application file for complete search history.

(56) References Cited

U.S. PATENT DOCUMENTS

| 5,410,546 | A | * | 4/1995 | Boyer | G06F 11/10 714/763 |
| 5,974,518 | A | * | 10/1999 | Nogradi | H04L 49/90 709/236 |
| 7,313,652 | B2 | * | 12/2007 | Mitra | H04L 67/02 711/122 |
| 7,372,864 | B1 | * | 5/2008 | Reast | H04L 47/10 370/428 |
| 9,639,460 | B1 | * | 5/2017 | Karppanen | G06F 12/023 |

* cited by examiner

*Primary Examiner* — Henry Tsai
*Assistant Examiner* — Juanito Borromeo
(74) *Attorney, Agent, or Firm* — Sheppard Mullin Richter & Hampton LLP

(57) ABSTRACT

Systems, methods, and non-transitory computer-readable media can receive a plurality of web templates associated with a web page. A buffer having a fixed, pre-determined length is allocated. A first set of data associated with a first web template of the plurality of web templates is copied to the buffer. A second set of data associated with a second web template of the plurality of web templates is copied to the buffer.

20 Claims, 8 Drawing Sheets

SYSTEMS AND METHODS FOR RENDERING DATA BASED ON FIXED-LENGTH TEMPLATING

FIELD OF THE INVENTION

The present technology relates to the field of page rendering. More particularly, the present technology relates to systems and methods for page rendering using fixed-length templating.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

SUMMARY

Various embodiments of the present disclosure can include systems, methods, and non-transitory computer readable media configured to receive a plurality of web templates associated with a web page. A buffer having a fixed, pre-determined length is allocated. A first set of data associated with a first web template of the plurality of web templates is copied to the buffer. A second set of data associated with a second web template of the plurality of web templates is copied to the buffer.

In an embodiment, each web template of the plurality of web templates comprises template data associated with a set of render instructions and dynamic render data defining a web page element to be rendered.

In an embodiment, the buffer comprises a template data portion having a first fixed length, and a render data portion having a second fixed length.

In an embodiment, copying the first set of data associated with the first web template of the plurality of web templates to the buffer comprises: copying a first set of template data associated with the first web template to the template data portion; and copying a first set of dynamic render data associated with the first web template to the render data portion.

In an embodiment, the copying the second set of data associated with the second web template of the plurality of web templates to the buffer comprises: copying a second set of dynamic render data associated with the second web template to the render data portion without modifying the template data portion.

In an embodiment, the copying the second set of data associated with the second web template of the plurality of web templates to the buffer is performed based on a determination that template data associated with the second web template is substantially identical to template data stored within the buffer.

In an embodiment, the allocating the buffer is performed based on a determination that template data associated with the first web template is not substantially identical to template data stored within any existing buffer.

In an embodiment, a first web page element is rendered based on the first set of data.

In an embodiment, a second web page element is rendered based on the second set of data.

In an embodiment, the first and second web page elements are provided to a user computing device for presentation to a user.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
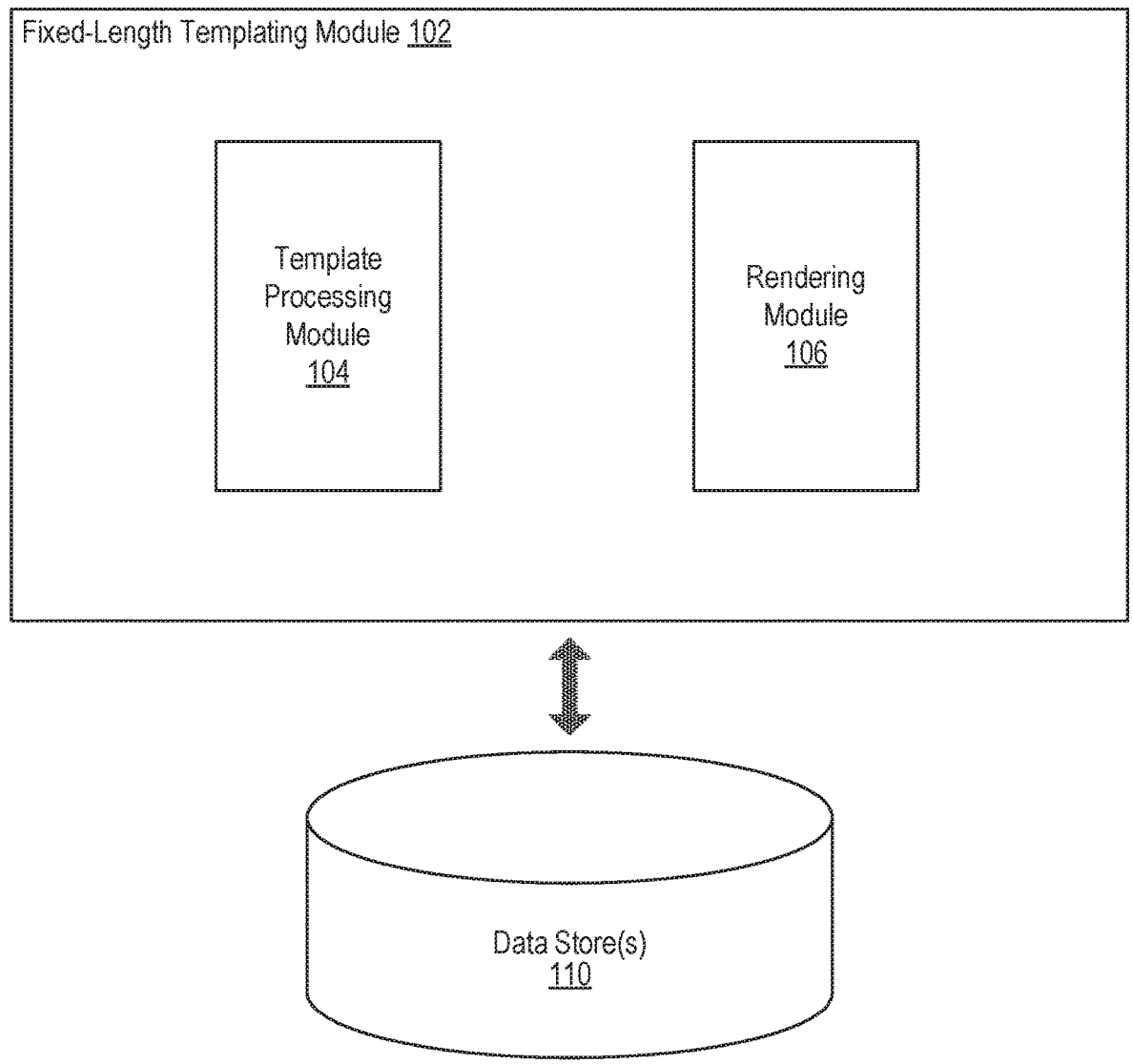
FIG. 1 illustrates an example system including a fixed-length templating module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Rendering Data Based on Fixed-Length Templating

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

When users attempt to access a web page, such as a web page on a social networking system, web templates may be used to render the web page. For example, a web server that receives a request for a particular web page can retrieve one or more web templates associated with the web page. The web server can process the one or more web templates to render the web page. The rendered web page can then be provided to a user computing device to display the web page (e.g., within a web browser presented on a display of the user computing device).

However, rendering web pages based on web templating can be very CPU-intensive. This is particularly true for web pages containing a large number of dynamic elements that are constantly changing and being updated, as may be the case on a social networking system. For example, consider a simple example scenario in which a web page has two web templates to be rendered, and each of the two web templates is configured to render a username. For example, the two web templates may have the following form: <html> <body> <% username %> </body> </html>. The first web template can be configured to render a first username, "Doug," and the second web template can be configured to render a second username, "Zachariah." In rendering the web page, a web server will generally allocate a buffer based on a size associated with the first web template. The web server can then copy initial template data for the first web template into the buffer (e.g., "<html> <body>"), copy dynamic render data for the first web template to the buffer (e.g., "Doug"), and copy final template data for the first web template into the buffer (e.g., "</body> </html>"). This essentially translates to four steps that are performed by a web server CPU: (1) allocate a buffer; (2) copy initial template data to the buffer; (3) copy and render dynamic render data to the buffer; and (4) copy final template data to the buffer.

Once the first web template has been processed and rendered, the web server can process the second web template. It can be seen in the above example that the dynamic render data in the second web template (i.e., "Zachariah") has a different size than the dynamic render data in the first web template (i.e., "Doug"). As such, more buffer space must be allocated for the second web template than was allocated for the first web template. Under conventional systems, in order to render the second web template, the web server CPU will typically repeat all four steps described above, i.e., allocate a new buffer based on a size associated with the second web template, copy initial template data for the second web template into the new buffer, copy dynamic render data for the second web template into the new buffer, and copy final template data for the second web template into the new buffer. If there are additional web templates, the four steps are repeated for each additional web template. Conventional approaches fail to take advantage of significant similarities between web templates, resulting in inefficiencies and unnecessary repetition of steps. Repetition of CPU-intensive rendering tasks may slow down web render speeds, and may be detrimental to user experience. Accordingly, conventional approaches may not be effective in addressing these and other problems arising in computer technology.

An improved approach rooted in computer technology overcomes the foregoing and other disadvantages associated with conventional approaches specifically arising in the realm of computer technology. In general, a plurality of web templates associated with a web page can be processed using a single buffer that is allocated one time for a first web template, and then re-used and updated for any remaining web templates. Only dynamic portions within the buffer are re-written and updated, while unchanged portions of the buffer are not re-written. In accordance with the present technology, systems and methods can maintain a buffer of a fixed length while processing web templates having different sizes by using padding to account for differences in size. The present technology can achieve improvements in CPU performance for processing and/or rending a plurality of web templates by allocating a single, fixed-length buffer, re-using the allocated buffer, re-using unchanged portions of the buffer, and re-writing only changed portions of the buffer. This is in contrast to conventional approaches that re-allocate a buffer and re-write the entire buffer for every web template. Additional details about the disclosed technologies will be provided herein.

FIG. 1 illustrates an example system 100 including a fixed-length templating module 102, according to an embodiment of the present disclosure. The fixed-length templating module 102 can be configured to render a plurality of web templates associated with a web page. In various embodiments, the fixed-length templating module 102 can be configured to identify a plurality of web templates associated with a web page. Each web template of the plurality of web templates can comprise template data associated with a set of render instructions, and dynamic render data defining an element to be rendered. In various embodiments, each web template of the plurality of web templates can comprise substantially identical template data. The fixed-length templating module 102 can process a first web template of the plurality of web templates. The first web template can comprise a first set of template data and a first set of dynamic render data. Processing the first web template can comprise allocating a buffer. In various embodiments, the buffer can have a pre-determined, fixed length or size. The fixed-length templating module 102 can copy the first set of template data to a template data portion of the buffer, and can copy the first set of dynamic render data to a render data portion of the buffer. The template data portion and the render data portion of the buffer can have fixed lengths. The render data portion, despite having a fixed length, can accommodate dynamic render data of different sizes by using padding to fill in any unused portion of the render data portion. A first web page element can be rendered based on the first set of dynamic render data.

The fixed-length templating module 102 can process a second web template of the plurality of web templates. The second web template can comprise a second set of template data and a second set of dynamic render data. In various embodiments, processing the second web template can comprise a determination that the second set of template data is substantially identical to template data currently stored in an existing buffer. Based on that determination, the existing buffer is not re-allocated, the template data portion of the existing buffer is not changed, and the second set of dynamic render data is copied to the render data portion of the existing buffer. The fixed-length templating module 102 can render a second element based on the second set of dynamic render data. The fixed-length templating module 102 can provide a rendered web page comprising the first and second elements to a user computing device for presentation to a user.

As shown in the example of FIG. 1, the fixed-length templating module 102 can include a template processing module 104 and a rendering module 106. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the fixed-length templating module 102 can be implemented in any suitable combinations.

In some embodiments, the fixed-length templating module 102 can be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the fixed-length templating module 102 can be implemented, in part or in whole, as software running on one or more computing devices or systems, such as on a user or client computing device. For example, the fixed-length templating module 102, or at least a portion thereof, can be implemented as or within an application (e.g., app), a program, or an applet, etc., running on a user computing device or a client computing system, such as the user device 610 of FIG. 6. In another example, the fixed-length templating module 102, or at least a portion thereof, can be implemented using one or more computing devices or systems that include one or more servers, such as network servers or cloud servers. In some instances, the fixed-length templating module 102 can, in part or in whole, be implemented within or configured to operate in conjunction with a social networking system (or service), such as the social networking system 630 of FIG. 6. It should be understood that there can be many variations or other possibilities.

The fixed-length templating module 102 can be configured to communicate and/or operate with the at least one data store 110, as shown in the example system 100. The data store 110 can be configured to store and maintain various types of data. In some implementations, the data store 110 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 110 can store information that is utilized by the fixed-length templating module 102. For example, the data store 110 can store one or more web pages, web templates, rendering instructions, rendered elements, rendered web pages, buffers, and the like. It is contemplated that there can be many variations or other possibilities.

The template processing module 104 can be configured to process one or more web templates associated with a web page. Each web template of the one or more web templates can comprise template data associated with a set of render instructions, and dynamic render data defining an element to be rendered. The template processing module 104 can process a first web template of the one or more web templates. The first web template can comprise a first set of template data and a first set of dynamic render data. Processing the first web template can comprise allocating a buffer. In various embodiments, the buffer can have a pre-determined, fixed size. The template processing module 104 can copy the first set of template data to a template data portion of the buffer, and can copy the first set of dynamic render data to a render data portion of the buffer. The template data portion and the render data portion of the buffer can have fixed lengths. The template processing module 104 can fill with padding any portion of the render data portion that is unused after copying the first set of dynamic render data. As discussed above, fill-padding allows for the fixed-length render data portion to accommodate render data having different sizes.

The template processing module 104 can be configured to identify one or more additional web templates of the one or more web templates that have template data substantially identical to the first set of template data. The template processing module 104 can process each of the one or more additional web templates by re-using the template data portion of the buffer, and updating the render data portion of the buffer with dynamic render data associated with the additional web template. By updating only the render data portion of the buffer and re-using the template data portion of the buffer, the buffer is re-used (i.e., is not re-allocated) for each of the one or more additional web templates. The template processing module 104 is described in greater detail herein with reference to FIG. 2.

The rendering module 106 can be configured to render one or more web page elements associated with a web page. In some embodiments, each web page element can be associated with a web template associated with the web page. As described herein, when a web template is processed, template data and dynamic render data associated with the web template are copied to a buffer. The rendering module 106 can render a web page element based on template data and dynamic render data copied to a buffer. As each web template in a plurality of web templates is processed, dynamic rendering data in the buffer is updated, and the rendering module 106 can render a web page element each time dynamic rendering data is updated in the buffer. The rendering module 106 can also be configured to transmit and/or provide one or more rendered web page elements to a user computing device for presentation to a user. For example, once a plurality of web templates associated with a web page have been processed, resulting in a plurality of rendered web page elements, the plurality of web page elements can be provided to a user computing device so that the web page can be presented to a user.

Figure 2:
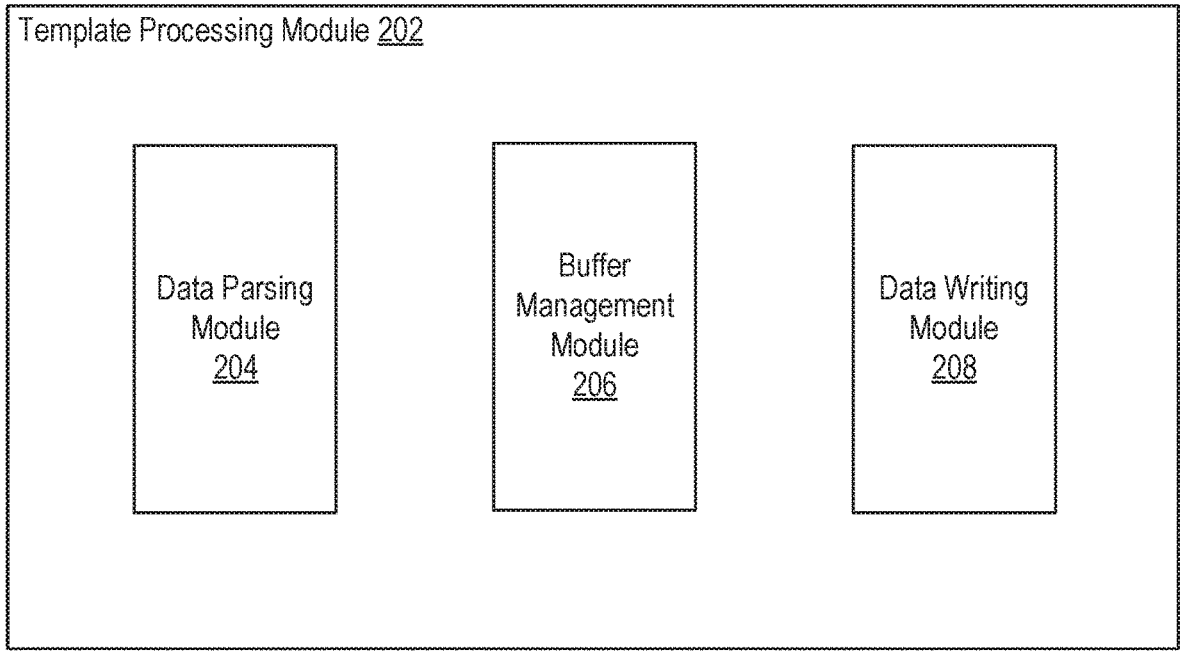
FIG. 2 illustrates an example template processing module, according to an embodiment of the present disclosure.

FIG. 2 illustrates an example template processing module 202 configured to process one or more web templates associated with a web page, according to an embodiment of the present disclosure. In some embodiments, the template processing module 104 of FIG. 1 can be implemented as the template processing module 202. As shown in the example of FIG. 2, the template processing module 202 can include a data parsing module 204, a buffer management module 206, a data writing module 208.

The data parsing module 204 can be configured to receive a web template associated with a web page, and to parse the web template into a plurality of components. In certain embodiments, a web template can comprise template data associated with a set of instructions for rendering web page elements, and dynamic render data defining a web page element to be rendered. The data parsing module 204 can be configured to parse a web template into template data and dynamic render data. In certain embodiments, template data can comprise HTML start and end tag information. In certain embodiments, dynamic render data can comprise HTML code content positioned between HTML start and end tags.

The buffer management module 206 can be configured to determine whether to allocate a new buffer or re-use an existing buffer for processing a web template. As discussed above, the web template can include template data and dynamic render data. The buffer management module 206 can be configured to determine whether to allocate a new buffer or to re-use an existing buffer based on the template data associated with the web template being processed. If the template data is substantially identical to template data stored in an existing buffer, the buffer management module 206 can determine that the existing buffer can be re-used for processing the web template. In certain embodiments, an existing buffer is re-used if the template data is identical to template data stored in the existing buffer. In certain embodiments, an existing buffer is re-used if the template data in the web template comprises the same type and number of tags as template data stored in the existing buffer. Conversely, if the template data is not substantially identical to template data stored in an existing buffer, the buffer management module 206 can determine that a new buffer should be allocated. In such a case, the buffer management module 206 can allocate a new buffer to process the web template.

The data writing module 208 can be configured to write (i.e., copy) data to a buffer. If it has been determined that a new buffer should be allocated to process a web template, the data writing module 208 can copy template data associated with the web template to a template data portion of the new buffer, and dynamic render data associated with the web template to a render data portion of the new buffer. However, if it has been determined that an existing buffer can be re-used to process a web template, the data writing module 208 can leave a template data portion of the existing buffer unchanged, and can copy dynamic render data associated with the web template to a render data portion of the existing buffer. In other words, the data writing module 208 can update the render data portion of the existing buffer without modifying the template data portion of the buffer. The data writing module 208 can also be configured to fill any unused portion of the dynamic render portion with padding after dynamic render data has been copied to the dynamic render portion. In certain embodiments, the template data portion and/or the render data portion may be divided into multiple, non-contiguous portions. For example, the template data portion can include a first (e.g., an initial) template data portion and a second (e.g., final) template data portion. The first template data portion and the second template data portion can be written separately within a buffer. For example, the first template data portion can precede a render data portion within the buffer, and the second template data portion can follow the render data portion within the buffer. Many variations are possible.

Various features and benefits of the present disclosure will now be discussed with reference to three example scenarios depicted in FIGS. 3, 4A, and 4B, which are simplified for purposes of illustration. Each example scenario is associated with rendering of a web page comprising two web templates. The two web templates are configured to render usernames. A first web template is configured to render the username "Doug" and a second web template is configured to render the username "Zachariah." FIG. 3 illustrates processing of the two web templates using some conventional techniques, while FIGS. 4A-B illustrate processing of the two web templates based on fixed length templating, according to various embodiments of the present disclosure.

Figure 3:
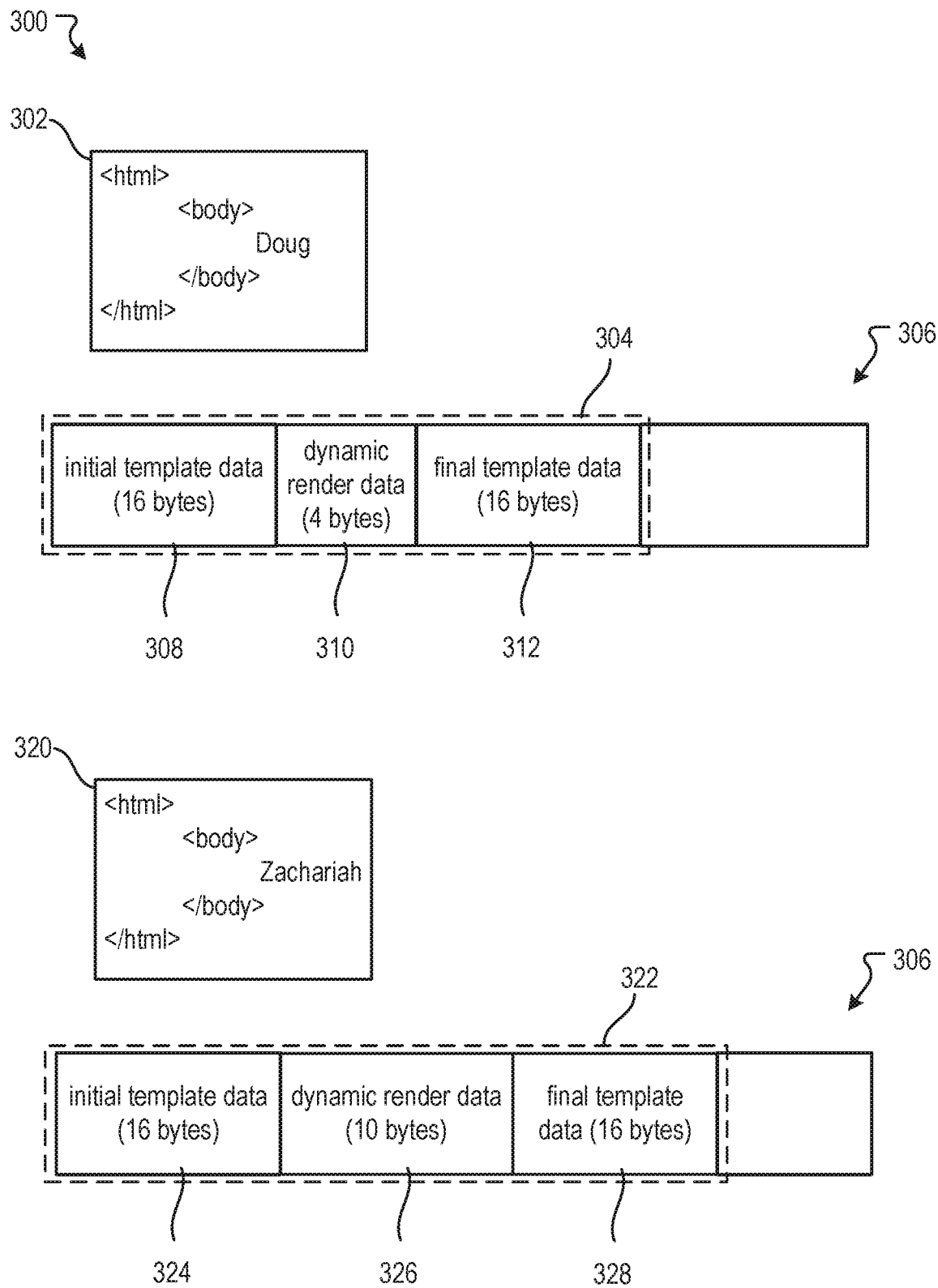
FIG. 3 illustrates an example scenario associated with conventional data rendering approaches.
Figure 4A:
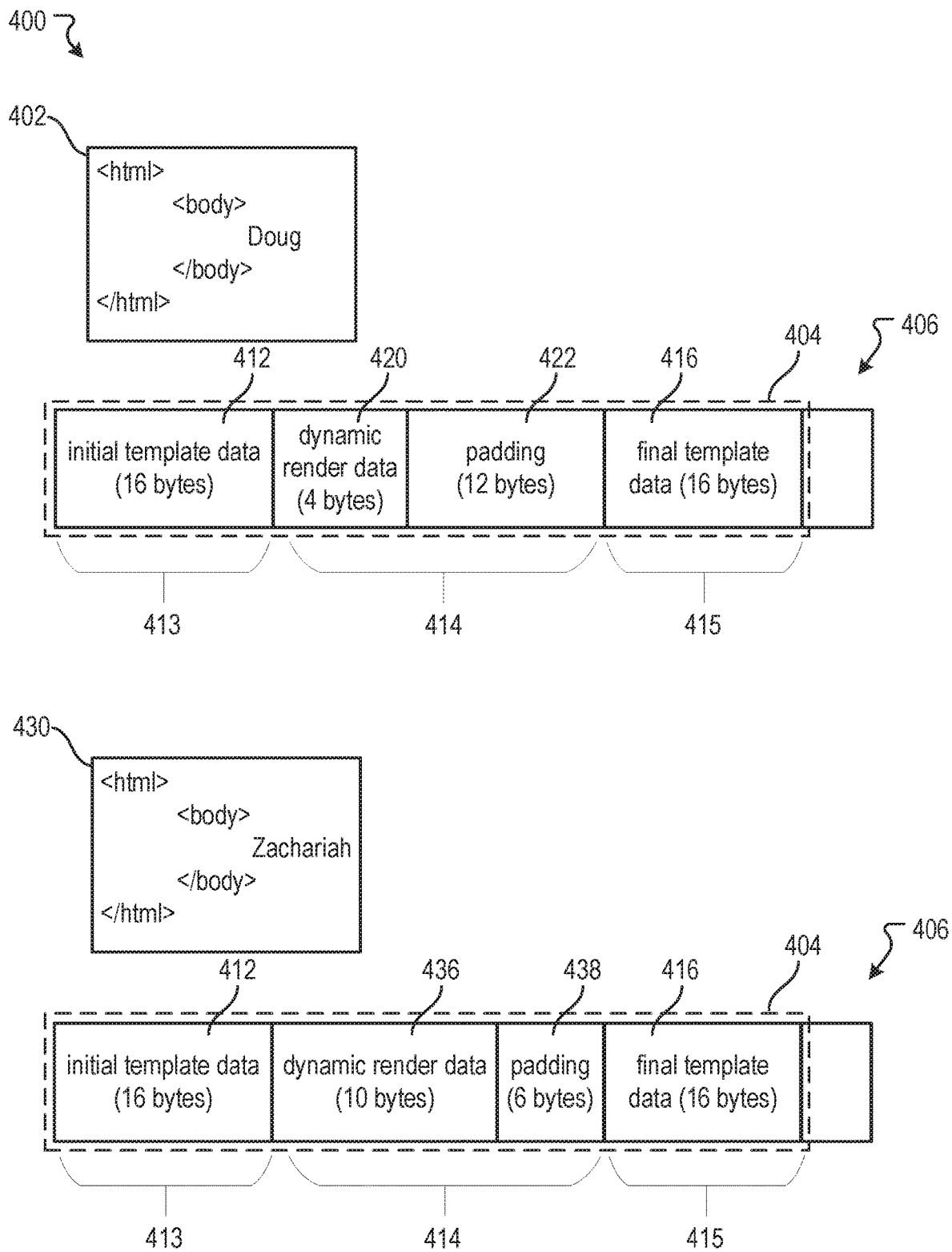
FIG. 4A illustrates an example scenario associated with rendering data using fixed-length templating, according to an embodiment of the present disclosure.
Figure 4B:
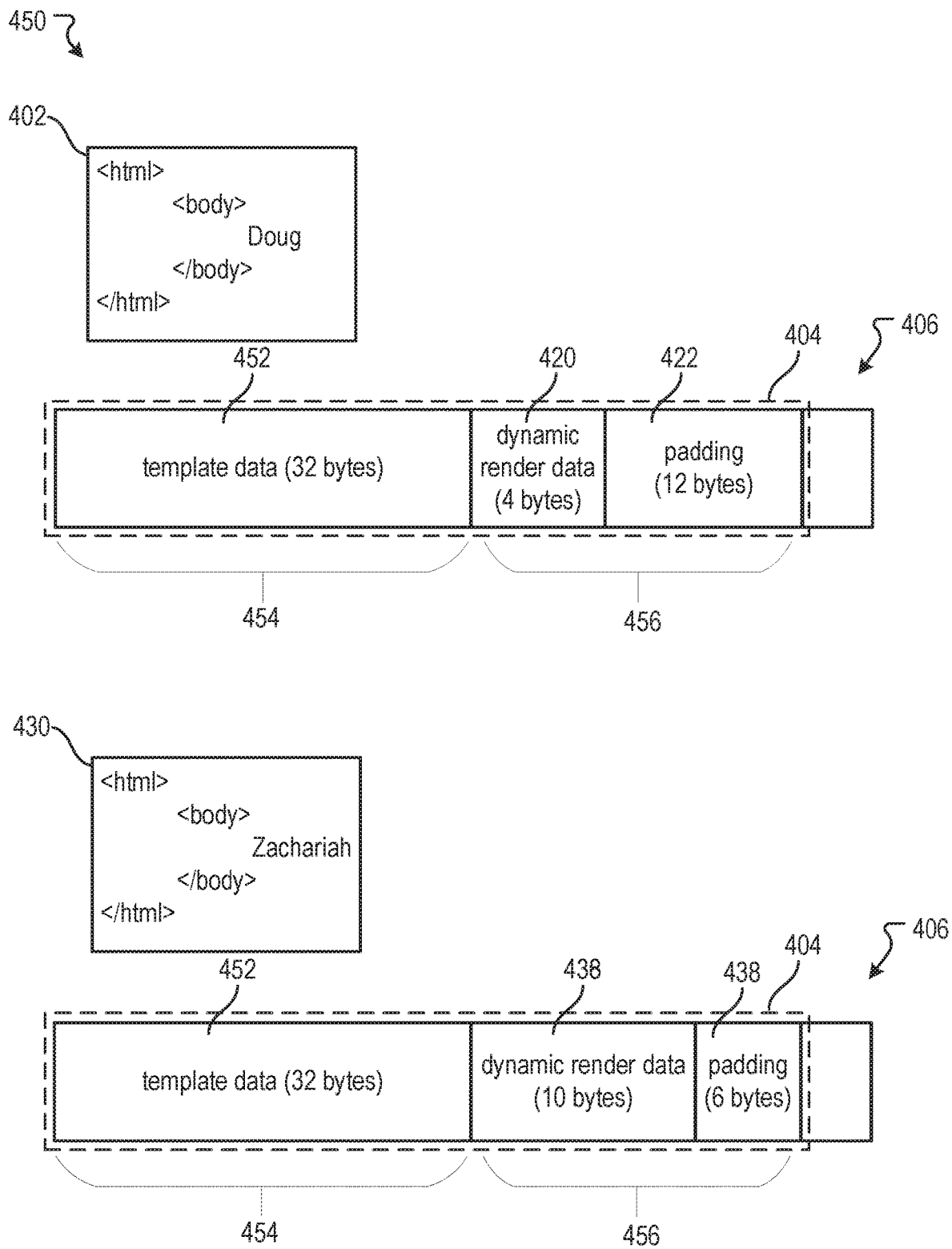
FIG. 4B illustrates another example scenario associated with rendering data using fixed-length templating, according to an embodiment of the present disclosure.

FIG. 3 illustrates an example scenario 300 associated with conventional processing of web templates. The example scenario 300 includes a first web template 302 for rendering a username "Doug" and a second web template 320 for rendering a username "Zachariah." The first web template 302 comprises initial template data 308 ("<html> <body>"), dynamic render data 310 ("Doug"), and final template data 312 ("</html> </body>"). In the example scenario 300, the initial template data 308 is 16 bytes, the dynamic render data 310 is 4 bytes, and the final template data 312 is 16 bytes. The sizes of the template data and the dynamic render data in FIGS. 3 and 4 can be other values in other examples. Under some conventional approaches, processing the first web template 302 can comprise allocating a buffer 304 within a memory 306, and copying the initial template data 308, the dynamic render data 310, and the final template data 312 to the buffer 304. The buffer 304 is allocated based on size requirements associated with the web template 302.

The second web template 320 comprises initial template data 324 ("<html> <body>"), dynamic render data 326 ("Zachariah"), and final template data 328 ("</html> </body>"). In the example scenario 300, the initial template data 324 is identical to the initial template data 308, and the final template data 328 is identical to the final template data 312. As such, the initial template data 324 is 16 bytes and the final template data 328 is 16 bytes. However, the dynamic render data 326 is different from the dynamic render data 310. The dynamic render data 326 is 10 bytes, which is 6 bytes longer than the dynamic render data 310. Under some conventional approaches, processing the second web template 320 can comprise allocating a buffer 322 within the memory 306, and copying the initial template data 324, the dynamic render data 326, and the final template data 328 to the buffer 322. The buffer 322 that is allocated for the second web template 320 must be larger than the buffer 304 allocated for the first web template 302 to accommodate the larger dynamic render data 326. Although the first web template 302 and the second web template 320 have identical template data, the initial template data 324 and the final template data 328 must be re-written in the new buffer 322.

In total, the example scenario 300 includes eight CPU tasks that are undertaken to process the first web template 302 and the second web template 320: (1) allocate a first buffer 304; (2) copy initial template data 308 to the first buffer 304; (3) copy dynamic render data 310 to the first buffer 304; (4) copy final template data 312 to the first buffer 304; (5) re-allocate a new buffer 322; (6) copy initial template data 324 to the new buffer 322; (7) copy dynamic render data 326 to the new buffer 322; and (8) copy final template data 328 to the new buffer 322.

FIG. 4A illustrates an example scenario 400 associated with processing a plurality of web templates based on fixed-length templating, according to an embodiment of the present disclosure. Similar to the example scenario 300, the example scenario 400 includes a first web template 402 configured to render a username "Doug" and a second web template 430 configured to render a username "Zachariah."

The first web template 402 includes initial template data 412 of 16 bytes, dynamic render data 420 of 4 bytes, and final template data 416 of 16 bytes. In processing the first web template 402, a buffer 404 is allocated in a memory 406. However, the buffer 404 is not allocated based on a size of the first web template 402. Rather, the buffer 404 has a fixed size, which, in this example, is 48 bytes. The initial template data 412 is written to a first portion 413 of the buffer 404, and the final template data 416 is written to a second portion 415 of the buffer 404. The first and second portions 413, 415 define a template data portion of the buffer 404. The template data portion has a fixed length, which, in this example, is 32 bytes. The remaining 16 bytes of the buffer 404 define a render data portion 414 of the buffer 404 having a fixed length of 16 bytes. The dynamic render data 420 is copied to the render data portion 414. However, the dynamic render data 420 is only 4 bytes in size. As such, the remaining 12 bytes of the render data portion 414 is filled with padding 422. The padding 422 is disregarded when the web template 402 is rendered.

The second web template 430 has the initial template data 412 and the final template data 416 that is identical to the first web template 402. As such, in the example scenario 400, it has been determined that the buffer 404 can be re-used for processing the second web template 430 based on the fact that the second web template 430 has template data that is substantially identical to template data stored in the buffer 404. Since the buffer 404 already stores the initial template data 412 and the final template data 416, the template data portion 413, 415 of the buffer 404 does not need to be changed when processing the second web template 430. As such, in accordance with the present disclosure, the render data portion 414 is updated with the dynamic render data 436. Again, any unused portion of the render data portion 414 can be filled in with padding 438.

As discussed above, the example scenario 300 shown in FIG. 3 included eight CPU tasks for processing two web templates. However, in the example scenario 400, savings are earned by allocating the buffer and copying template data only one time. As such, processing the two web templates 402, 430 requires only six CPU tasks: (1) allocate a buffer 404; (2) copy initial template data 412 to the buffer 404; (3) copy dynamic render data 420 to the buffer 404; (4) copy final template data 416 to the buffer 404; (5) determine that the buffer 404 can be re-used; and (6) copy dynamic render data 436 to the buffer 404. As such, in this simplified example, a savings of two CPU tasks is already realized. In web pages with additional web templates to be analyzed, and more complex web templates to be analyzed, even greater efficiencies can be achieved. The foregoing examples are for illustration purposes only, and many variations are possible.

FIG. 4B illustrates another example scenario 450 associated with processing a plurality of web templates based on fixed-length templating, according to an embodiment of the present disclosure. The example scenario 450 is very similar to the example scenario 400 of FIG. 4A. Like the example scenario 400, the example scenario 450 includes a first web template 402 configured to render a username "Doug" and a second web template 430 configured to render a username "Zachariah." The first web template 402 has the same template data and dynamic render data 420 as those discussed in FIG. 4A. However, rather than keeping separate the initial template data 412 and the final template data 416, they have been combined into a single template data 452 having a size of 32 bytes. As it will be seen, this small change further decreases the number of computing tasks performed by a CPU.

Similar to example scenario 400, in processing the first web template 402, a buffer 404 is allocated in a memory 406. Again, the buffer 404, in this example, has a fixed size of 48 bytes. In the example scenario 450, the template data 452 is written to a template data portion 454 of the buffer 404. The template data portion 454 has a fixed length, which, in this example, is 32 bytes. The remaining 16 bytes of the buffer 404 define a render data portion 456 having a fixed length of 16 bytes. Dynamic render data 420 is copied to the render data portion 454. Similar to example scenario 400, the dynamic render data 420 is only 4 bytes in size, and the remaining 12 bytes of the render data portion 456 is filled with padding 422.

The second web template 430 has template data 452 that is identical to the first web template 402. As such, in the example scenario 450, it has been determined that the buffer 404 can be re-used for processing the second web template 430 based on the fact that the second web template 430 has template data that is substantially identical to template data 452 stored in the buffer 404. Since the buffer 404 already stores the template data 452, the template data portion 454 does not need to be changed when processing the second web template 430. As such, in accordance with the present disclosure, the render data portion 456 is updated with dynamic render data 436. Again, any unused portion of the render data portion 456 can be filled in with padding 438.

As discussed above, the example scenario 300 shown in FIG. 3 included eight CPU tasks for processing two web templates, and the example scenario 400 shown in FIG. 4A included six CPU tasks. However, in the example scenario 450, further savings are earned by combining all template data and writing the template data into the buffer in a single step. As such, processing the two web templates 402, 430 requires only five CPU tasks: (1) allocate a buffer 404; (2) copy template data 452 to the buffer 404; (3) copy dynamic render data 420 to the buffer 404; (4) determine that the buffer 404 can be re-used; and (5) copy dynamic render data 436 to the buffer 404. As such, in this simplified example, a savings of three CPU tasks is realized over the example scenario 300. Once again, in web pages with additional web templates to be analyzed, and more complex web templates to be analyzed, even greater efficiencies can be achieved. The foregoing examples are for illustration purposes only, and many variations are possible.

Figure 5:
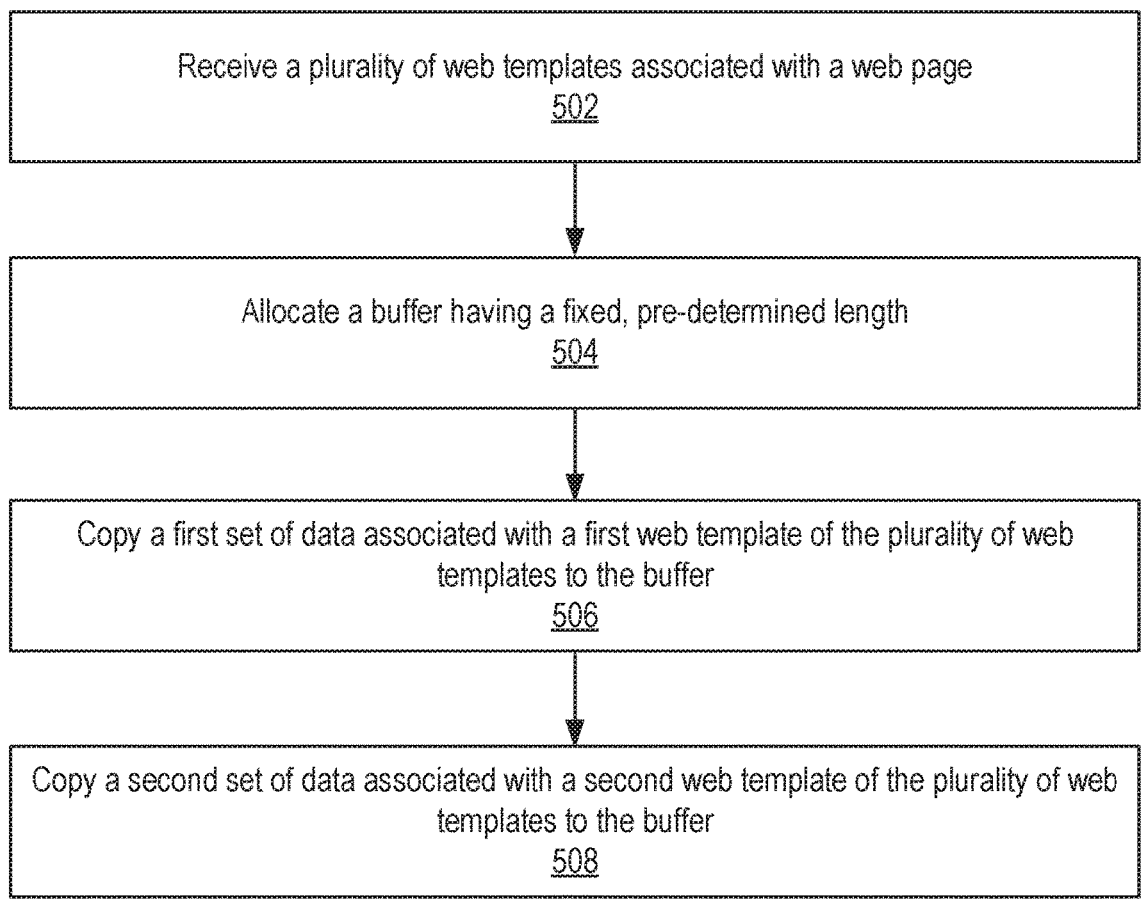
FIG. 5 illustrates an example method associated with rendering data using fixed-length templating, according to an embodiment of the present disclosure.

FIG. 5 illustrates an example method 500 associated with rendering data using fixed-length templating, according to an embodiment of the present disclosure. It should be appreciated that there can be additional, fewer, or alternative steps performed in similar or alternative orders, or in parallel, within the scope of the various embodiments discussed herein unless otherwise stated.

At block 502, the example method 500 can receive a plurality of web templates associated with a web page. At block 504, the example method 500 can allocate a buffer having a fixed, pre-determined length. At block 506, the example method 500 can copy a first set of data associated with a first web template of the plurality of web templates to the buffer. At block 508, the example method 500 can copy a second set of data associated with a second web template of the plurality of web templates to the buffer.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
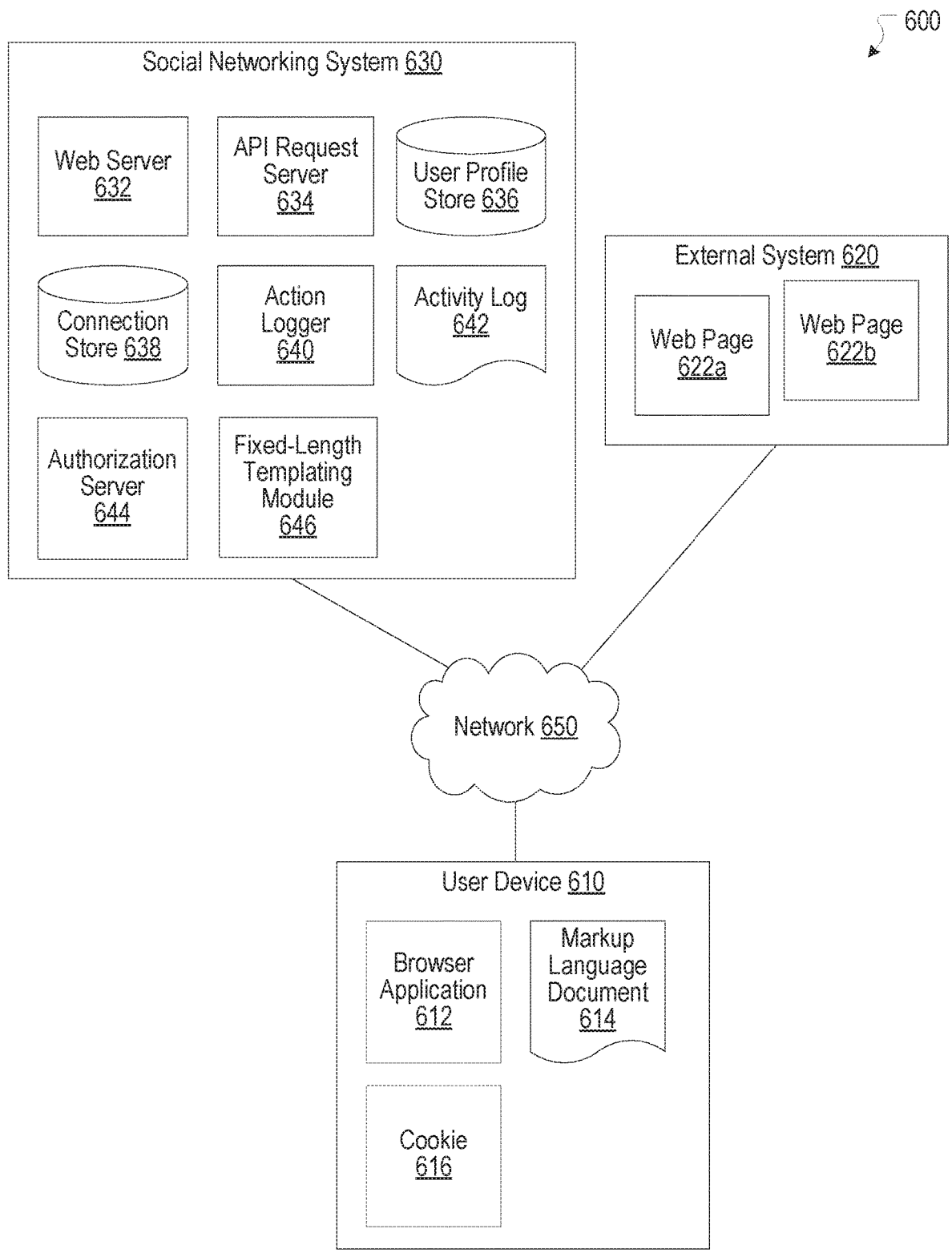
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "oneway." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a fixed-length templating module 646. The fixed-length templating module 646 can, for example, be implemented as the fixed-length templating module 102, as discussed in more detail herein. As discussed previously, it should be appreciated that there can be many variations or other possibilities. For example, in some embodiments, one or more functionalities of the fixed-length templating module 646 can be implemented in the user device 610.

Hardware Implementation

Figure 7:
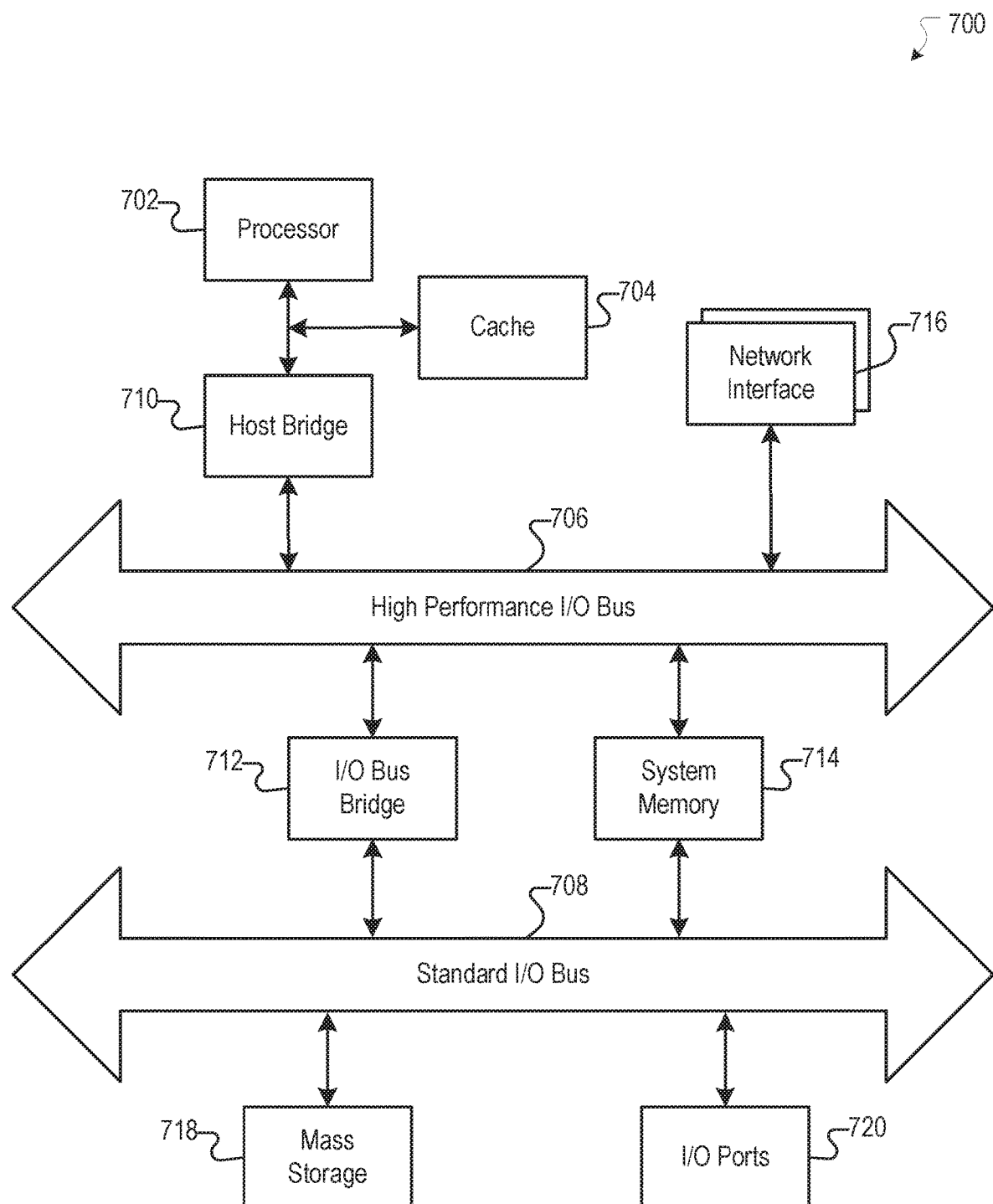
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
receiving, by a computing system, a plurality of web templates associated with a web page, wherein:
at least one web template of the plurality of web templates comprises template data and render data, the template data comprises a start tag and an end tag associated with a set of render instructions, and
the render data references a web page element to be rendered in the web page based on the set of render instructions;
allocating, by the computing system, a buffer within a memory, the buffer having a fixed, pre-determined length, wherein the buffer comprises a template data portion and a render data portion having a fixed length;
copying, by the computing system, a first set of data associated with a first web template of the plurality of web templates to the buffer;
determining, by the computing system, whether template data associated with a second web template of the plurality of web templates is identical to template data associated with the first web template that is stored within the buffer; and copying, by the computing system, a second set of data associated with the second web template of the plurality of web templates to the buffer.

2. The computer-implemented method of claim 1, wherein render data associated with the first web template is a first set of dynamic render data having a first size and render data associated with the second web template is a second set of dynamic render data having a second size different from the first size.

3. The computer-implemented method of claim 2, wherein the copying the first set of data associated with the first web template of the plurality of web templates to the buffer comprises:

copying a first set of template data associated with the first web template to the template data portion; and copying the first set of dynamic render data associated with the first web template to the render data portion.

4. The computer-implemented method of claim 3, wherein the copying the second set of data associated with the second web template of the plurality of web templates to the buffer comprises:

copying the second set of dynamic render data associated with the second web template to the render data portion without modifying the template data portion.

5. The computer-implemented method of claim 1, wherein the copying the second set of data associated with the second web template of the plurality of web templates to the buffer is performed based on a determination that the template data associated with the second web template is identical to the template data associated with the first web template that is stored within the buffer.

6. The computer-implemented method of claim 1, wherein the allocating the buffer is performed based on a determination that the template data associated with the first web template is not identical to template data stored within any existing buffer.

7. The computer-implemented method of claim 1, further comprising rendering a first web page element based on the first set of data.

8. The computer-implemented method of claim 7, further comprising rendering a second web page element based on the second set of data.

9. The computer-implemented method of claim 8, further comprising providing the first and second web page elements to a user computing device for presentation to a user.

10. A system comprising:
at least one processor; and
a memory storing instructions that, when executed by the at least one processor, cause the system to perform a method comprising:
receiving a plurality of web templates associated with a web page, wherein:
at least one web template of the plurality of web templates comprises template data and render data,
the template data comprises a start tag and an end tag associated with a set of render instructions, and
the render data references a web page element to be rendered in the web page based on the set of render instructions;
allocating a buffer within a memory, the buffer having a fixed, pre-determined length, wherein the buffer comprises a template data portion and a render data portion having a fixed length;
copying a first set of data associated with a first web template of the plurality of web templates to the buffer;
determining whether template data associated with a second web template of the plurality of web templates is identical to template data associated with the first web template that is stored within the buffer; and
copying a second set of data associated with the second web template of the plurality of web templates to the buffer.

11. The system of claim 10, wherein render data associated with the first web template is a first set of dynamic render data having a first size and render data associated with the second web template is a second set of dynamic render data having a second size different from the first size.

12. The system of claim 11, wherein the copying the first set of data associated with the first web template of the plurality of web templates to the buffer comprises:

copying a first set of template data associated with the first web template to the template data portion; and copying the first set of dynamic render data associated with the first web template to the render data portion.

13. The system of claim 12, wherein the copying the second set of data associated with the second web template of the plurality of web templates to the buffer comprises:

copying the second set of dynamic render data associated with the second web template to the render data portion without modifying the template data portion.

14. A non-transitory computer-readable storage medium including instructions that, when executed by at least one processor of a computing system, cause the computing system to perform a method comprising:
receiving a plurality of web templates associated with a web page, wherein:
at least one web template of the plurality of web templates comprises template data and render data,
the template data comprises a start tag and an end tag associated with a set of render instructions, and
the render data references a web page element to be rendered in the web page based on the set of render instructions;
allocating a buffer within a memory, the buffer having a fixed, pre-determined length, wherein the buffer comprises a template data portion and a render data portion having a fixed length;
copying a first set of data associated with a first web template of the plurality of web templates to the buffer;
determining whether template data associated with a second web template of the plurality of web templates is identical to template data associated with the first web template that is stored within the buffer; and
copying a second set of data associated with the second web template of the plurality of web templates to the buffer.

15. The non-transitory computer-readable storage medium of claim 14, wherein render data associated with the first web template is a first set of dynamic render data having a first size and render data associated with the second web template is a second set of dynamic render data having a second size different from the first size.

16. The non-transitory computer-readable storage medium of claim 15, wherein the copying the first set of data associated with the first web template of the plurality of web templates to the buffer comprises:

copying a first set of template data associated with the first web template to the template data portion; and copying the first set of dynamic render data associated with the first web template to the render data portion.

17. The non-transitory computer-readable storage medium of claim 16, wherein the copying the second set of data associated with the second web template of the plurality of web templates to the buffer comprises:
   copying the second set of dynamic render data associated with the second web template to the render data portion without modifying the template data portion.

18. The computer-implemented method of claim 2, wherein the render data portion accommodates sets of dynamic render data of different sizes by using padding to fill in any unused portion of the render data portion.

19. The system of claim 11, wherein the render data portion accommodates sets of dynamic render data of different sizes by using padding to fill in any unused portion of the render data portion.

20. The non-transitory computer-readable storage medium of claim 15, wherein the render data portion accommodates sets of dynamic render data of different sizes by using padding to fill in any unused portion of the render data portion.

* * * * *